United States Patent [11] 3,631,361

[72] Inventor Norman C. Blumenthal
Brooklyn, N.Y.
[21] Appl. No. 746,442
[22] Filed July 22, 1968
[45] Patented Dec. 28, 1971
[73] Assignee The Singer Company
New York, N.Y.

[54] ROOM TEMPERATURE LIQUID LASER
5 Claims, 3 Drawing Figs.

[52] U.S. Cl. .................................................... 331/94.5,
252/301.4
[51] Int. Cl. .......................................................... H01s
[50] Field of Search ............................................ 331/94.5;
252/301.4

[56] References Cited
OTHER REFERENCES

Addison, " Use of Nonaqueous Solvents in Inorganic Chemistry" Royal Inst. of Chem. Monograph No. 2, Nov. 28, 1960, pp. 4– 7.

Heller, " A High Gain Room-Temp. Liquid Laser...," App. Phys. Lett. (APL), 9, (3), Aug. 1 66, pp. 106– 108

Lempicki & Heller, "Characteristics of the $Nd^{3+}$: $SeOCl_2$ Liquid Laser," App. Phys. Lett. (APL), 9, (3), Aug. 1, 66, pp. 108– 110.

Logowski, " The Chemistry of Nonaqueous Solutions" Vol. I, Academic Press (New York) 1966, pp. 11– 15

Lempicki & Samelson, " Liquid Lasers," Scientific American 216, June 1967, pp. 81– 90.

Shepherd, "Some Preparative Details of the $Nd^{3+}/SeOCl_2$ Laser," Nature 216, Dec. 23, 1967, pp. 1200

Gutmann, " Coordination Chemistry in Nonaqueous Solutions," Springer-Verlog/Wien (New York. Wien) Apr. 30, 1968, pp. 103, 104, 111– 113.

*Primary Examiner*—Ronald L. Wibert
*Assistant Examiner*—R. J. Webster
*Attorneys*—S. A. Giarratana and G. B. Oujevolk

ABSTRACT: A liquid laser was produced by using solutions of a nonhydrogen containing neodymium compound, e.g., neodymium oxide in a 5:1 by volume solution of phosphorous oxychloride and strong nonhydrogen containing (aprotic) acid, e.g., tin tetrachloride contained in a tubular transparent cell using optical flats bonded to the ends of the cell, external dielectric mirrors aligned parallel to the ends of the cell and exciting the substance in the cell with a flash lamp.

PATENTED DEC 28 1971 3,631,361

INVENTOR
NORMAN C. BLUMENTHAL
BY S. A. Giarratana
George B. Oujevolk
ATTORNEYS

ROOM TEMPERATURE LIQUID LASER

BACKGROUND OF THE INVENTION

The present invention relates to liquid lasers, and more particularly, to a liquid laser which has good optical properties, high efficiency, and is of relatively low cost. The invention herein described was made in the course of or under a contract or subcontract thereunder with the Department of the Navy.

DESCRIPTION OF THE PRIOR ART

Liquid systems offer several distinct and unique advantages over solid and gaseous systems as active materials for laser use. A gaseous system, unless under high pressure, cannot generate a large energy density; this is simply because the density of atoms is low compared with a liquid or a solid. Thus, in comparing a gaseous system with a condensed phase system, even if all other parameters are identical, the absolute population inversion will be much less for a gas. It has been estimated that the inverted population is approximately a thousand times greater in liquids or solids. There are several factors that greatly restrict the actual power that is practically obtainable from solid media, particularly when one is considering continuous or high-repetition rate operation. The foremost of these limitations is the inability of a solid to dissipate the heat generated in high-power operation; this problem, of course, increases as the repetition rate goes up. Aside from possible gross fracture of the material, heating creates many imperfections which ruin the optical quality of the sample, very often irreversibly. Liquids offer the advantage of being able to be cooled by circulation. Optical defects, such as bubbles or regions of differing refractive indices brought about by thermal gradients, heal themselves very rapidly in a liquid, especially in a flowing stream. A good liquid material, therefore, must have certain mechanical and physical properties, aside from the obvious consideration of satisfying the necessary fluorescence criteria. It must be relatively inert and possess a reasonable viscosity so as to facilitate pumping and the self-healing of thermally caused defects. Good thermal stability of both solvent and fluorescent species, along with as wide a liquid temperature range as possible for the solvent, are two other criteria which must be satisfied.

Liquid systems that have been shown capable of laser action include some europium tetrakis chelates in acetonitrile or ethanol-methanol solutions [A. Lempicki and H. Samelson, "Applied Physics Letters," 4, 133 (1963); E. J. Schimitachek, "Applied Physics Letters," 3, 117 (1963)] and a solution of neodymium in selenium oxychloride [A. Heller, "Applied Physics Letters," 9, 108 (9166). A. Lempicki and A. Heller, "Applied Physics Letters," [3] 9, 108–110 (1966)]. Rare-earth chelates have a number of unfavorable features which make laser operations at high-power levels very difficult. The organic chelate serves to absorb the pump light, and lasing action depends on efficient energy transfer from the chelate portion of the molecule to the rare-earth ion. There is an inherent difficulty with these systems that arises from the very high extinction coefficients ($10^4$ to $10^5$) and broad absorption bands of the chelate unit. As a result, for systems of practical concentration ($10^{-2}$ to $10^{-3}$ M), it is impossible to achieve a population inversion beyond a thin surface region of the solution. So much of the pump flux will be absorbed in this region that extremely small-bore laser cells are required in order to uniformly excite the sample. In most cases, lasing will occur only in a narrow annulus at the periphery of the tube.

In the system described in this invention and in the neodymium-selenium oxychloride system the pump flux is directly absorbed by the rare-earth ion, which has an extinction coefficient three to four orders of magnitude smaller than the chelate, thus assuring much more uniform excitation and lasing. The selenium oxychloride system suffers principally from its high viscosity which makes circulation of the lasing medium very difficult, from high toxicity, corrosivity, and thermal instability.

SUMMARY OF THE INVENTION

Generally speaking the present invention contemplates producing a liquid laser in contrast to the systems of the prior art by using solutions of a nonhydrogen containing neodymium compound in a 5:1 by volume solution of phosphorous oxychloride and a strong nonhydrogen containing (aprotic) acid contained in a tubular quartz cell and exciting the substance in the cell with a flash lamp.

The objects and advantages of the present invention will be more readily understood by those skilled in the art after detailed consideration of the following detailed description taken with the accompanying drawings.

DETAILED DESCRIPTION

Figure 1:
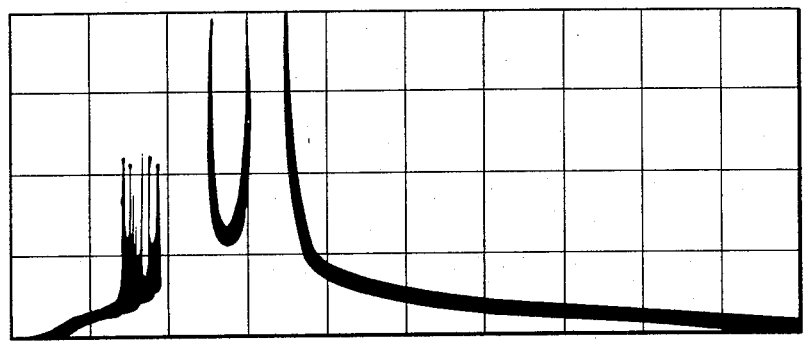
FIGS. 1 to 3 show the results obtained from exciting the liquid laser substance of this invention with a flash lamp as described in the example herein given.

Since the science of liquid lasers is quite new, to properly understand the invention, it is first necessary to visualize the liquid laser system and the problems involved in such a system.

The fluorescence and absorption characteristics of some rare-earth ions in solution are of great importance in regard to the design and development of high-powered laser systems. Rare-earth ions exhibit narrow-lined fluorescence. Liquid solutions of these ions seem to offer the best opportunities for high-powered lasers, since these solutions do not suffer from certain shortcomings found in gaseous and solid systems.

As hereinbefore mentioned, a tetrakis Eu(III) diketone chelate has shown capability of laser action in acetonitrile or methanol-ethanol solutions. The function of the diketone chelate ligand is to absorb a large amount of the pump flux and to efficiently transfer the energy to the Eu(III) electronic energy system, which then fluoresces in its characteristic atomic bands. In this way the atomic fluorescence is enhanced by means of the large number of excited states created through the high absorption coefficient of the diketone chelate. It is possible to enhance the fluorescence of rare-earth atomic transitions by reducing the nonradiative relaxation process, controlling the symmetry of the ligand field so that certain absorption and emission bands become more probable, or both.

It would therefore appear that what is required is a. a fluorescent substance having radiative transitions suitable for lasing and, b. a solution for the substance capable of favorably influencing the fluorescence by creating a suitable environment for the fluorescent species. Thus, the liquid solution serves not only as a mobile medium to dissolve the rare-earth compound, but also to precisely control the immediate chemical environment around each rare-earth ion and thereby favorably influence fluorescence and the other properties relevant to laser activities.

It is then readily apparent that the usual solvents such as found in a handbook of solvents will not serve the purpose. After extensive research it was found the desired qualities would be produced by solutions of nonhydrogen containing neodymium compounds such as $Nd_2O_3$ in a 5:1 mixture by volume of $POCl_3$ with $SnCl_4$. The 1.06$\mu$ neodymium fluorescence from the solution is very intense and remains essentially constant in intensity up to its boiling point of about 90°–100° C. The solution has low viscosity and is very clear. $SnCl_4$ acts as an acid, ionizing the solvent by forming the two species $POCl_2^+$ and $SnCl_6^=$. Any strong nonhydrogen containing (aprotic) acid will function in the same manner as tin tetrachloride. This acidification enables the liquid to dissolve $Nd_2O_3$.

EXAMPLE

Solutions were prepared (approximately 0.1M in neodymium oxide) by adding neodymium oxide ($Nd_2O_3$) to the mixed (5:1) solvent, heating to incipient boiling, cooling, and centrifuging to remove any suspended matter. No special handling precautions are required except for the gloves and fume hood normally employed with acide chlorides. The system has the advantages of relatively low toxicity and, in the proportions specified, has low viscosity at room temperature.

Figure 2:
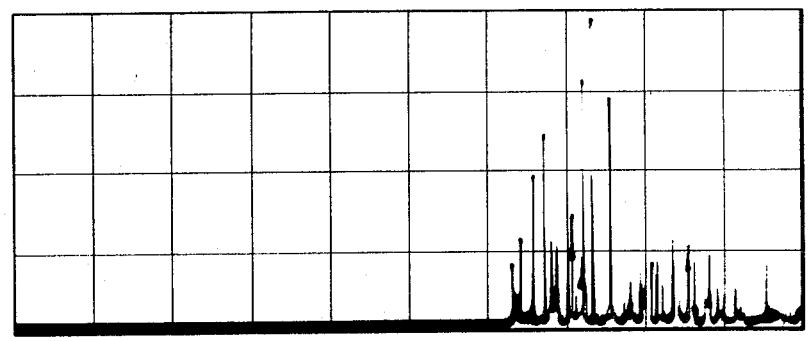
Figure 3:
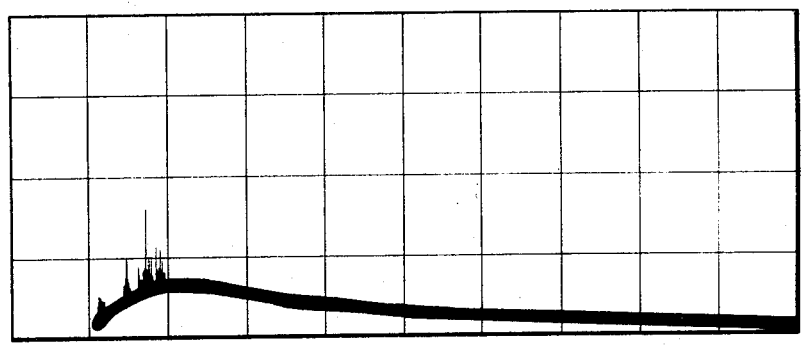

A dilute solution of neodymium oxide in the 5:1 mixture (by volume) of phosphorous oxychloride and tin tetrachloride was then excited with the 5,000-joule pulse of a helical xenon flash lamp. Random spiking (FIGS. 1 and 2) and a very large intensity increase over the fluorescence level were detected above a threshold near 3,300 joules, through a $1.06\mu$ interference filter with an RCA 925 photodiode feeding a 545A Tektronix scope across a 47-ohm-load resistor. The liquid was contained in a 12 mm. ID 12.5 cm. long tubular quartz cell. Quartz optical flats were cemented to the ends with epoxy. External plane mirrors with dielectric coatings were aligned parallel to the ends of the cell. One mirror had more than 99 percent reflectivity and the other had 10 percent transmission at $1.06\mu$. FIG. 3 shows the onset of spiking with a slightly different mirror arrangement in a more concentrated solution, (0.12M in $Nd_2O_3$).

Lasing continued to be obtained at the original intensity after repeated pulsing of the liquid with unfiltered light, including the ultraviolet, from the xenon lamp.

A high degree of collimation was indicated by photographing the fluorescence pattern produced when the $1.06\mu$ laser beam was intercepted by an infrared sensitive phosphor card placed 4 feet from the partially transmitting mirror. No focusing lens was employed in this experiment.

While the present invention has been described in a preferred embodiment, it will be obvious to those skilled in the art that various modifications can be made therein within the scope of the invention, and it is intended that the appended claims cover all such modification.

What is claimed is:

1. A liquid lasing material comprising a quantity of neodymium oxide dissolved in a solvent made up of about 5 parts by volume of phosphorous oxychloride to about 1 part by volume of tin tetrachloride.

2. The process of making a liquid laser substance comprising the steps of placing a solution of neodymium oxide in a solvent made up of about 5 parts by volume of phosphorous oxychloride to about 1 part of tin tetrachloride.

3. The process of forming a liquid laser beam comprising the steps of placing the substance claimed in claim 2 in a tubular transparent cell, bonding optical flats to the ends of said cell, using external mirrors and exciting said substance in said cell with a flash lamp.

4. A liquid laser material comprising a quantity of a nonhydrogen containing neodymium compound dissolved in a solvent made up of about 5 parts by volume of phosphorous oxychloride to about 1 part by volume of tin tetrachloride.

5. A liquid laser material comprising a quantity of a nonhydrogen containing neodymium compound dissolved in a solvent made up of about 5 parts by volume of phosphorous oxychloride to about 1 part by volume of a strong nonhydrogen containing (aprotic) acid.

* * * * *